United States Patent
Rodgers

(10) Patent No.: US 8,986,807 B2
(45) Date of Patent: Mar. 24, 2015

(54) FIRE RESISTANT ARTIFICIAL TURF

(75) Inventor: John Rodgers, Hixson, TN (US)

(73) Assignee: Tarkett Inc., Quebec (CA)

( * ) Notice: Subject to any disclaimer, the term of this patent is extended or adjusted under 35 U.S.C. 154(b) by 864 days.

(21) Appl. No.: 13/193,953

(22) Filed: Jul. 29, 2011

(65) Prior Publication Data

US 2012/0263892 A1    Oct. 18, 2012

Related U.S. Application Data

(60) Provisional application No. 61/476,599, filed on Apr. 18, 2011.

(51) Int. Cl.
*E01C 13/08*    (2006.01)
*A01G 1/00*    (2006.01)

(52) U.S. Cl.
CPC ............... *A01G 1/002* (2013.01); *Y10S 428/92* (2013.01); *Y10S 428/921* (2013.01)
USPC ............... 428/87; 428/17; 428/403; 428/407; 428/920; 428/921

(58) Field of Classification Search
CPC ............... E01C 13/08; E01C 2013/08; D10B 2505/202; Y10S 273/13
USPC .............. 428/17, 87, 402, 403, 407, 920, 921
See application file for complete search history.

(56) References Cited

U.S. PATENT DOCUMENTS

| | | | |
|---|---|---|---|
| 3,549,724 A | 12/1970 | Okazaki | |
| 3,565,742 A | 2/1971 | Stephens | |
| 3,837,980 A | 9/1974 | Nishimura | |
| 4,044,179 A | 8/1977 | Hass, Jr. | |
| 4,176,150 A | 11/1979 | Bromley | |
| 4,337,283 A | 6/1982 | Haas, Jr. | |
| 5,006,057 A | 4/1991 | Bagrodia | |
| 5,922,462 A | 7/1999 | Kent | |
| 6,582,819 B2 * | 6/2003 | McDaniel et al. | 428/402 |
| 6,632,527 B1 * | 10/2003 | McDaniel et al. | 428/402 |
| 6,815,059 B2 | 11/2004 | Slootweg | |
| 6,955,841 B2 | 10/2005 | Weghuis | |
| 7,824,133 B1 | 11/2010 | Lazaro | |
| 8,568,852 B2 * | 10/2013 | Smit et al. | 428/87 |
| 2001/0033902 A1 | 10/2001 | Seaton | |
| 2003/0099787 A1 | 5/2003 | Fink | |

(Continued)

FOREIGN PATENT DOCUMENTS

| | | |
|---|---|---|
| EP | 0 259 940 B1 | 7/1992 |
| EP | 0 432 272 B1 | 5/1995 |

(Continued)

OTHER PUBLICATIONS

Water resistance flame retardants for preventing forest fires; Raff, et al.

(Continued)

*Primary Examiner* — Cheryl Juska
(74) *Attorney, Agent, or Firm* — Winston & Strawn LLP

(57) ABSTRACT

An artificial turf system that includes a plurality of pellets in an infill disposed on a backing material and between individual synthetic fibers extending away from the backing material, wherein the pellets are a fire retardant material, for example, a salt, and more particularly an inorganic salt, encapsulated in a water insoluble material.

10 Claims, 1 Drawing Sheet

(56) References Cited

U.S. PATENT DOCUMENTS

| | | |
|---|---|---|
| 2003/0108688 A1 | 6/2003 | De Vries |
| 2003/0157275 A1 | 8/2003 | Weghuis |
| 2004/0099178 A1 | 5/2004 | Jones et al. |
| 2005/0064112 A1 | 3/2005 | Nicholls |
| 2007/0160800 A1 | 7/2007 | Reddick |
| 2008/0317978 A1 | 12/2008 | Smit |
| 2010/0010135 A1 | 1/2010 | Brand et al. |
| 2012/0258811 A1* | 10/2012 | Tetrault et al. ............. 472/92 |
| 2013/0078394 A1* | 3/2013 | Taylor ......................... 428/17 |

FOREIGN PATENT DOCUMENTS

| | | |
|---|---|---|
| EP | 1 378 592 A1 | 1/2004 |
| EP | 1 389 649 A2 | 2/2004 |
| EP | 1 158 099 B1 | 4/2006 |
| EP | 1 386 944 B1 | 9/2006 |
| GB | 938768 | 10/1963 |
| JP | 61-257504 A | 11/1986 |
| JP | 1-127703 A | 5/1989 |
| JP | 6-157222 A | 6/1994 |
| JP | 7-324011 A | 12/1995 |
| JP | 2003171908 A * | 6/2003 |
| JP | 2010163760 A * | 7/2010 |
| JP | 2010248802 A * | 11/2010 |
| KR | 1073378 B1 * | 10/2011 |
| KR | 1295230 B1 * | 8/2013 |
| WO | 02/00973 A1 | 1/2002 |
| WO | 02/22960 A1 | 3/2002 |
| WO | 03/082965 A1 | 10/2003 |
| WO | 2004/041721 A1 | 5/2004 |
| WO | 2004/106601 A1 | 12/2004 |
| WO | 2005/005730 A1 | 1/2005 |
| WO | 2005/047602 A1 | 5/2005 |

OTHER PUBLICATIONS

Search Report and Written Opinion from PCT/US2011/45877, dated Dec. 29, 2011.

* cited by examiner

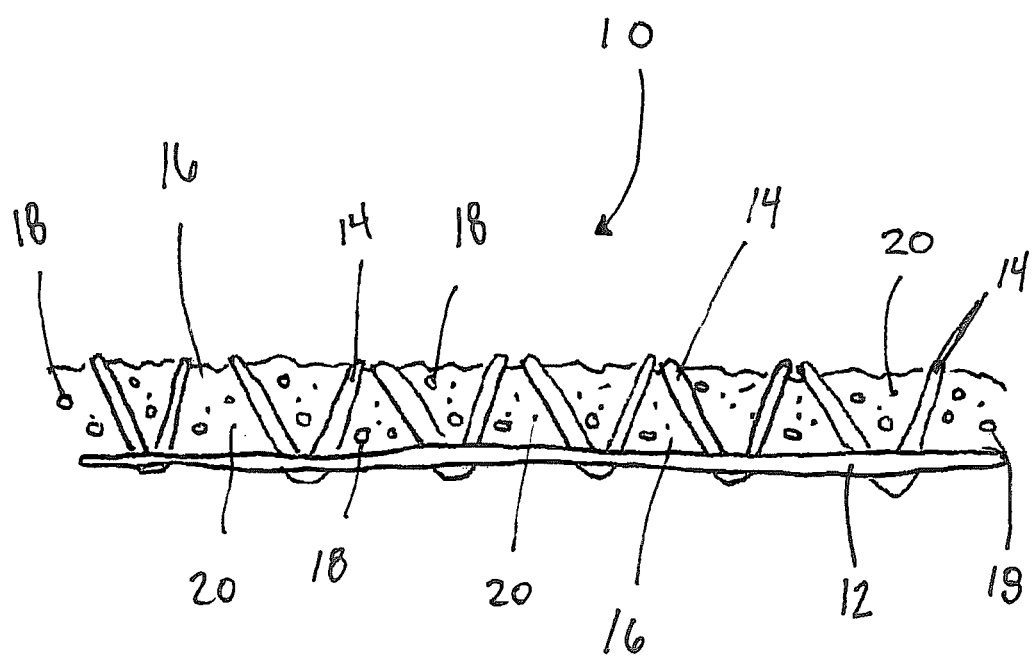

FIRE RESISTANT ARTIFICIAL TURF

CROSS REFERENCE TO RELATED APPLICATIONS

This application claims priority to U.S. Provisional Patent Application 61/476,599 filed on Apr. 18, 2011, the entirety of which is incorporated herein by reference.

FIELD OF THE INVENTION

The invention relates to an artificial turf system and more particularly to an artificial turf system that utilizes a fire resistant material in the infill.

BACKGROUND OF THE INVENTION

Artificial turf systems (also known as artificial/synthetic grass) have become a popular alternative for a natural grass field. These artificial turf systems typically include fibers comprised of polyethylene ("PE"), or other conventional polymer based fibers (including, but not limited to polypropylene ("PP") and polyamide ("PA")), and a particulate infill that typically includes, amongst other constituents, SBR rubber/elastomeric material. Although these materials are structurally and aesthetically practicable, they can, in many cases, create concerns associated with fire, and, in turn (in some systems) dissipation of potentially toxic by-products as a result of burning.

Polymer fibers are, on their own, flammable and could result in becoming the primary ignition fuel for a turf fire. Indeed, such fibers would burn hot and quickly, and self extinguish once all the polymer fuel is consumed, and could, if not contained, burn all the way down to the infill level.

In addition to the fibers, the rubber/elastomeric component of the infill can, with some rubber, likewise present a danger concern as the fibers burn. For example, once ignited by the fiber fire, such rubber could actually burn longer than the initial fiber supported fire. Accordingly, combustion of the particular rubber could then emit significant amounts of heavy black smoke that could be toxic in confined spaces, such as, for example, indoor athletic fields.

Many synthetic grass systems today are tested according to ASTM D 2859 and ASTM E648, or other equivalent or similar standard testing protocols. All of these tests can provide the purchaser of an artificial turf system with test results that indicate whether or not the particular turf system is relatively safe. However, many synthetic grass systems fail one or more of these tests, or are only given a class II certification.

Therefore, there remains a need for an artificial turf system that adequately addresses the containment of fire without unduly affecting the playing characteristics of the particular artificial turf system.

The present invention is directed to resolving the above concern/issues.

SUMMARY OF THE INVENTION

In one embodiment of the present invention, an artificial turf system is provided that includes a fire retardant material associated with and interspersed with the infill material, and between the individual fibers. Although the fire retardant material is shown throughout the infill, other orientations, such as all or greater concentrations of same at or near particular levels within the infill (such as near or at the top of the infill) are also contemplated. Indeed, in another preferred embodiment, the fire retardant material may actually comprise most or all of the actual infill material—thereby serving the dual role for fire safety, and desired playability characteristics typically associated with conventional infill material.

In a preferred embodiment, the fire retardant material comprises an inorganic salt, and more particularly an inorganic salt, in pellet form. It is contemplated that such pellets can be formulated to specific ranges of screen mesh sizes and densities so as to maintain operative positioning of same at the desired location(s) within the infill (such as at or near the top surface of same), and, in turn, in close proximity to the otherwise top/exposed ends of the synthetic fibers.

For example, the screen mesh size of the pellets can closely match the screen mesh sizes of the rubber/elastomeric material used in the infill, and, more particularly, the screen mesh size of the rubber/elastomeric material located at or near the top surface of the infill. It is also contemplated that the amount of fire retardant material be formulated so as to not adversely affect acceptable G-Max and/or other infill compaction/resiliency characteristics as may be desired and/or required for the particular synthetic turf system.

Moreover, given that the artificial turf systems are often located outside, and given that salts and organic salts are water soluble, it is contemplated that the fire retardant material is encapsulated in water resistant material, such as PE, PP or polyethylene terephthalate ("PET"), so as to avoid the dissolving of such salts upon inadvertent exposure to excessive water (i.e., rain). Of course other encapsulating materials are also contemplated by the present invention as long as such materials will preclude water/moisture from inadvertently penetrating the encapsulated fire retardant material, and provided such material will melt at a temperature at least equal to the temperature imparted by burning of adjacently or proximally positioned synthetic fibers. Accordingly, since the flame retardant material in the present invention is encapsulated in a water resistant material, the flame retardant material will remain dormant in the particulate infill with the other materials (sand, rubber, cork, etc.) unless and until a heat source (i.e., fire) hot enough to melt the coating occurs. Although not necessary, the present invention also contemplates that the protective coating include a color pigment that will blend in with the particular color of the associated infill (or any other color as desired) and if required, be stabilised against ultraviolet radiation (i.e., sunlight) breakdown.

If a fire is ignited on the artificial turf system, the encapsulating material, at or near the fire will melt, exposing the fire retardant material to the flame—which functions to extinguish the flame. Indeed, as the encapsulating material melts, the melted material (PE/PET) will form a barrier over and around the region it melts at. This barrier, in turn, establishes a perimeter where the fire cannot expand beyond inasmuch as the melted PE/PET fills voids between the particulate material of the infill, which, in turn, cuts off an oxygen source for the flames, thereby extinguishing the fire and propagation thereof.

An artificial turf system according to these aspects of the present invention will result in significantly improved fire resistant qualities and characteristics.

It is to be understood that the aspects and objects of the present invention described above may be combinable and that other advantages and aspects of the present invention will become apparent to those having ordinary skill in the art upon reading the following description of the drawing and the detailed description thereof.

BRIEF DESCRIPTION OF THE DRAWINGS

The present invention will become more fully apparent from the following description and appended claims, taken in conjunction with the accompanying drawing. Understanding that the accompanying drawing depicts only a typical embodiment, and is, therefore, not to be considered to be limiting of the scope of the present disclosure, the embodiments will be described and explained with specificity and detail in reference to the accompanying drawing as provided below.

FIG. 1 is a side schematic perspective view of an artificial turf system according to an embodiment of the present invention.

DETAILED DESCRIPTION OF THE DRAWINGS

While this invention is susceptible of embodiment in many different forms, there is shown in the drawing and will herein be described in detail one or more embodiments with the understanding that the present disclosure is to be considered as an exemplification of the principles of the invention and is not intended to limit the invention to the embodiments illustrated.

Reference throughout this description to features, advantages, objects or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

As shown in FIG. 1, an artificial turf system 10 according to an embodiment of the present invention includes a backing material 12, a plurality of synthetic fibers 14 extending away from the backing material 12, and, an infill 16 disposed on the backing material between the individual fibers 14. One of ordinary skill in the art will appreciate that the backing material 12 and the fibers 14 can be made from any number of suitable materials, including, but not limited to PE/PP/PET.

The infill 16 includes a plurality of pellets 18, wherein each pellet 18 contains a fire retardant material and is encapsulated by water insoluble material. (An example of acceptable encapsulated fire retardant materials are described in the attached paper entitled "*Water-Resistant Flame Retardants for Preventing Forest Fires*," authored by R. A. V. Raff, M. M. Mitchell, and M. F. Adams of Washington State University, Pullman, Wash.). The infill 16 may include other materials such as rubber 20, sand, cork, or any number of other materials. The infill may also include intumescent material.

It is contemplated that the fire retardant material is a salt, and more particularly an inorganic salt.

It is further contemplated that the water insoluble encapsulating material is PET. It is also contemplated that the water insoluble material and the fibers 14 are made from the same material.

In an experiment, an artificial turf system according to the present invention was constructed using infill with approximately 73% by volume of encapsulated fire retardant material located within the top ⅛" of the infill. This artificial turf system was tested according to ASTM E648 and was found to obtain class I certification levels.

In a second experiment, an artificial turf system according to the present invention was constructed using infill with approximately 55% by volume of encapsulated fire retardant material located within the top ⅛" of the infill. This artificial turf system was tested according to ASTM E648 and was found to obtain class II certification levels.

Further experiments were conducted in order to determine the ability of certain embodiments to achieve appropriate certification levels for ASTM E648. In order to achieve class I certification, the critical radiant flux rating must be greater than 0.45 watts/cm². In order to achieve class II certification, the critical radiant flux rating must be between 0.22 to 0.40 watts/cm². The results of these experiments are reproduced in the below Table 1.

TABLE 1

| % by volume of Fire Retardant Material | Burn Distance cm | Time to Flame Out min | Critical Radiant Flux watts/cm² | Fire Retardant Material Mass lb/ft² |
|---|---|---|---|---|
| 0% (Control) | 100 | 19 | 0.09 | 0.0 |
| 40% | 51 | 24 | 0.32 | 0.2083 |
| 50% | 67 | 43 | 0.17 | 0.2604 |
| 60% | 57 | 25 | 0.25 | 0.3125 |
| 75% | 62 | 23 | 0.22 | 0.3906 |
| 75% | 38 | 16 | 0.53 | 0.3906 |
| 100% | 15 | 28 | 1.07 | 0.5208 |
| 100% | 14 | 29 | 1.10 | 0.5208 |

In the above experiments, the percentage by volume of Fire Retardant Material represents the amount of fire retardant material, by volume, that replaced the rubber having 10-14 mesh size typically used in the infill for an artificial turf system. As can be seen, in order to achieve a class I certification, only 75% of this size rubber needs to be replaced with the fire retardant material.

The above volumes or locations of the pellets within the infill should in no way be deemed limiting. Indeed, they are merely examples. Other volumes, locations and attributes are also contemplated as long as the fire retardant material reduces the spreading of fire (or containment thereof) compared to a system devoid of such materials.

Another concern that must be addressed with artificial turf systems is the G-Max associated with the field. If the field is too hard it can be dangerous. Conversely, if a field is too soft it can detrimentally affect the playing characteristics of the field. It is believed that a G-Max between 100-200 is acceptable and safe. Accordingly, further experiments were conducted with various embodiments of the present invention. In a first test embodiment, 100% of the rubber having 10-14 mesh size was replaced with fire retardant material. In a second test embodiment, 100% of the rubber having a 14-30 mesh size was replaced with fire retardant material. In a third test embodiment, 75% (by volume) of the rubber having a 14-30 mesh size was replaced with fire retardant material. The results are shown in the below Table 2.

TABLE 2

| Drop No. | 1$^{st}$ Test Embodiment | 2$^{nd}$ Test Embodiment | 3$^{rd}$ Test Embodiment |
|---|---|---|---|
| 1 | 104.1 | 90.8 | 119.0 |
| 2 | 123.8 | 114.0 | 125.5 |
| 3 | 133.0 | 120.0 | 128.0 |
| 4 | 138.0 | 124.0 | 131.5 |
| 5 | 141.2 | 126.8 | 132.8 |
| 6 | 143.0 | 129.3 | 135.2 |
| 7 | 145.5 | 132.2 | 136.6 |
| 8 | 145.0 | 134.2 | 136.7 |

As can be seen from the data, the G-Max results for the various test embodiments show that the fire retardant material can be used in the infill of the artificial turf system without detrimentally affecting the G-Max.

Thus, an artificial turf system according to the present invention is believed to provide a system that minimizes risks and the potential for damage from fire and flames.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. An artificial turf system comprising:
   a backing material;
   a plurality of fibers extending away from the backing material, wherein the fibers are made from a polymer;
   an infill disposed on the backing material between the individual fibers, wherein the infill includes a plurality of fire retardant pellets; and
   a water insoluble material encapsulating the fire retardant pellets, wherein the water insoluble material is a polymer.

2. The artificial turf system of claim 1 where the fire retardant pellets are comprised of a salt.

3. The artificial turf system of claim 2 wherein the salt is an inorganic salt.

4. The artificial turf system of claim 1 wherein the infill comprises at least 55% by volume of the pellets located within the top 1/8" of the infill.

5. The artificial turf system of claim 1 wherein the infill comprises at least 73% by volume of the pellets located within the top 1/8" of the infill.

6. The artificial turf system of claim 1 wherein the infill further comprises rubber.

7. The artificial turf system of claim 6 wherein the infill further comprises sand.

8. The artificial turf system of claim 1 wherein the G-Max rating of the artificial turf system is between 100-200.

9. The artificial turf system of claim 1 wherein the polymer of the water insoluble material is selected from the group consisting of: polypropylene; polyethylene; and, polyethylene terephthalate.

10. The artificial turf system of claim 1, wherein the water insoluble material and the fibers are made from the same polymer.

* * * * *